US012132693B2

(12) United States Patent
Spolnicki et al.

(10) Patent No.: US 12,132,693 B2
(45) Date of Patent: Oct. 29, 2024

(54) NOTIFICATION AND TASK MANAGEMENT SYSTEM

(71) Applicant: Schlumberger Technology Corporation, Sugar Land, TX (US)

(72) Inventors: Brian Spolnicki, Houston, TX (US); Theja Swaroop Reddy Guvvala, Pune (IN); Julian Anigbogu, Houston, TX (US); Ethiraj Krishnamanaidu, Houston, TX (US); Shaoyu Chen, Beijing (CN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/310,376

(22) PCT Filed: Jan. 28, 2020

(86) PCT No.: PCT/US2020/015315
§ 371 (c)(1),
(2) Date: Jul. 29, 2021

(87) PCT Pub. No.: WO2020/159922
PCT Pub. Date: Aug. 6, 2020

(65) Prior Publication Data
US 2022/0103499 A1 Mar. 31, 2022

Related U.S. Application Data

(60) Provisional application No. 62/799,572, filed on Jan. 31, 2019.

(51) Int. Cl.
*H04L 51/214* (2022.01)
*E21B 47/12* (2012.01)
(Continued)

(52) U.S. Cl.
CPC ............ *H04L 51/214* (2022.05); *E21B 47/12* (2013.01); *H04L 41/16* (2013.01); *H04L 51/18* (2013.01); *H04L 51/226* (2022.05)

(58) Field of Classification Search
None
See application file for complete search history.

(56) References Cited

U.S. PATENT DOCUMENTS 5,131,092 A * 7/1992 Sackmann ........... G05B 19/056
709/215
2005/0261923 A1* 11/2005 Brown ................... G06Q 10/10
709/232
(Continued)

FOREIGN PATENT DOCUMENTS

JP 2010004185 A 1/2010
KR 100595444 B1 7/2006
WO 2013/144706 A2 10/2013

OTHER PUBLICATIONS

International Preliminary Report on Patentability of the equivalent International Patent Application No. PCT/US2020/015315 mailed Aug. 12, 2021, 7 pages.

(Continued)

*Primary Examiner* — Glenford J Madamba
*Assistant Examiner* — Abderrahmen Chouat
(74) *Attorney, Agent, or Firm* — Michael Guthrie

(57) ABSTRACT

A method may include receiving, at a listener channel, an event described by a message, determining, using the message, a subscriber of the listener channel, determining, using a delivery preference of the subscriber, an adapter to deliver the message, and dispatching, via the adapter, the message to the subscriber.

17 Claims, 14 Drawing Sheets

(51) Int. Cl.
      *H04L 41/16*           (2022.01)
      *H04L 51/18*           (2022.01)
      *H04L 51/226*         (2022.01)

(56) References Cited

U.S. PATENT DOCUMENTS

| | | | |
|---|---|---|---|
| 2007/0289013 | A1 | 12/2007 | Lim |
| 2012/0311045 | A1* | 12/2012 | Sylvain .................. H04L 51/56 709/206 |
| 2014/0164541 | A1* | 6/2014 | Marcellino ........... H04L 69/329 709/206 |
| 2014/0230069 | A1* | 8/2014 | Milman .............. H04L 63/0407 726/26 |
| 2015/0081621 | A1 | 3/2015 | Whiteley et al. |
| 2015/0112597 | A1* | 4/2015 | Laing ..................... E21B 44/00 702/9 |
| 2017/0180289 | A1* | 6/2017 | Chiappone ............ H04L 51/222 |
| 2017/0295121 | A1* | 10/2017 | Zhang ..................... H04L 51/02 |
| 2018/0007074 | A1* | 1/2018 | Kune ........................ G06F 1/28 |
| 2019/0095505 | A1* | 3/2019 | Young .................. G06Q 10/0833 |
| 2020/0028701 | A1* | 1/2020 | Liu ..................... H04W 68/005 |
| 2020/0067789 | A1* | 2/2020 | Khuti .................. H04L 41/5009 |

OTHER PUBLICATIONS

International Search Report and Written Opinion for International Application No. PCT/US2020/015315, mailed May 25, 2020, 10 pages.

\* cited by examiner

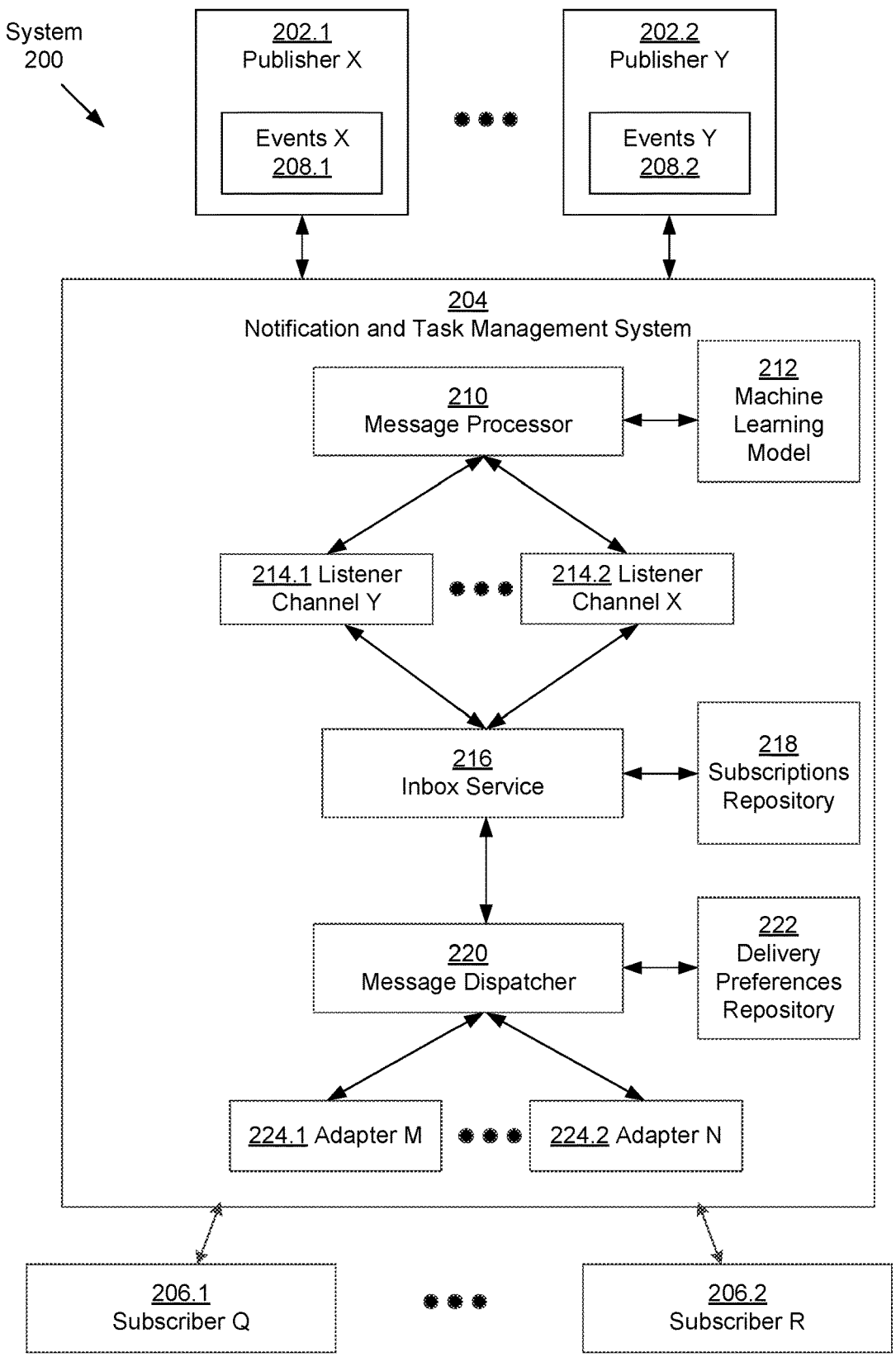
FIG. 2.1

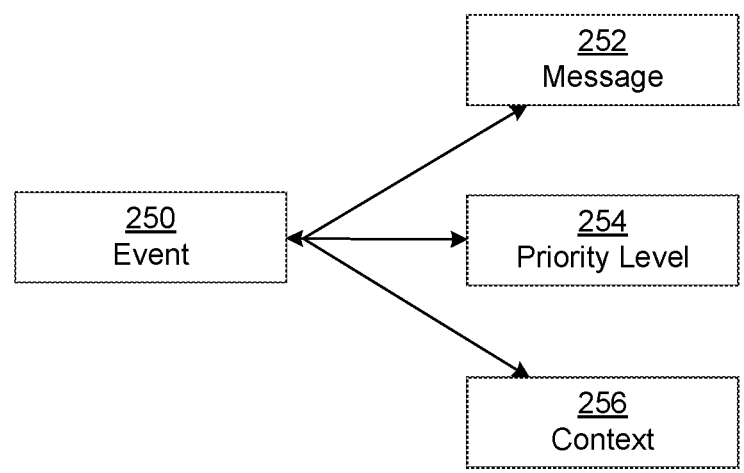
FIG. 2.2

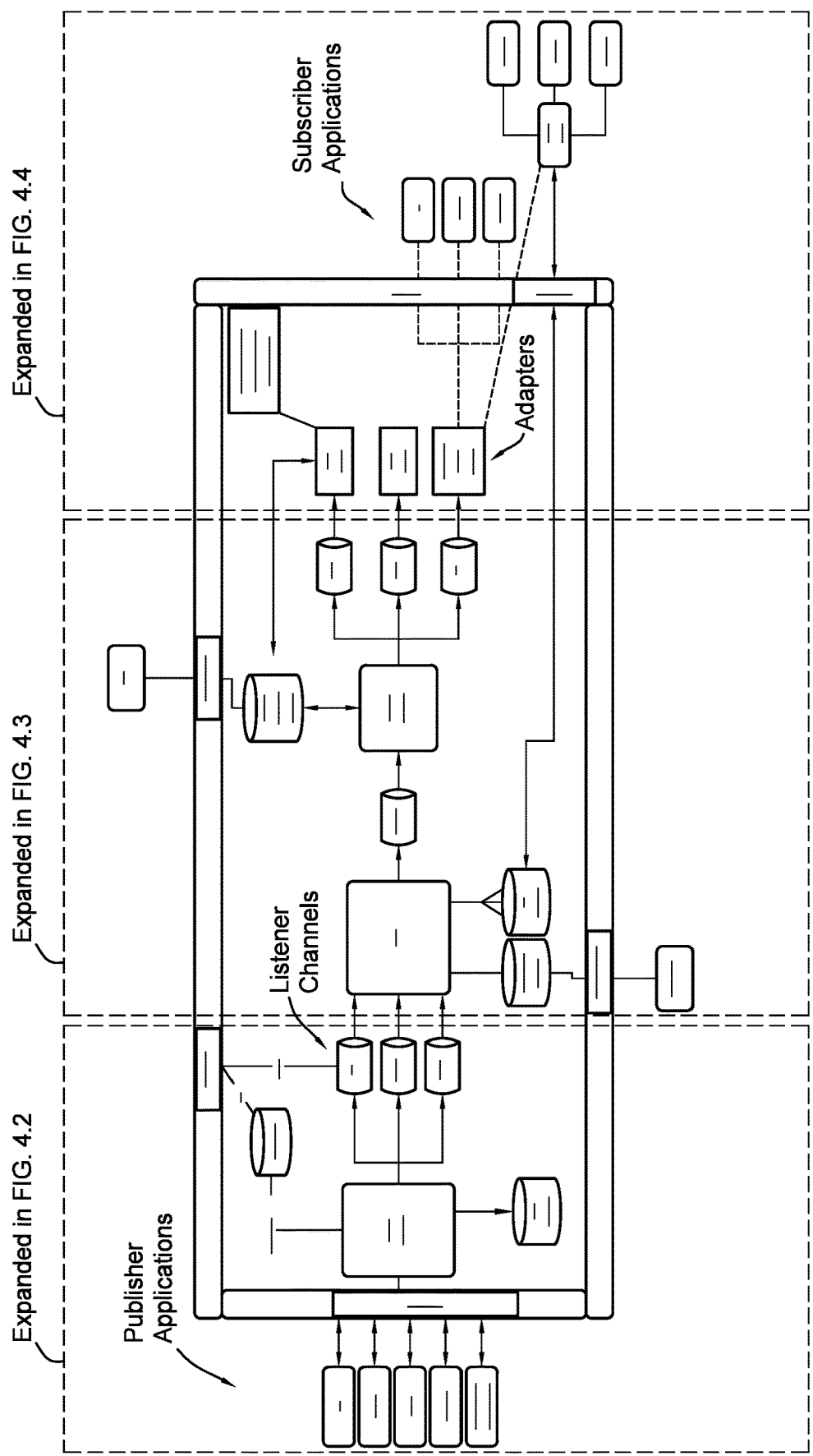
FIG. 4.1

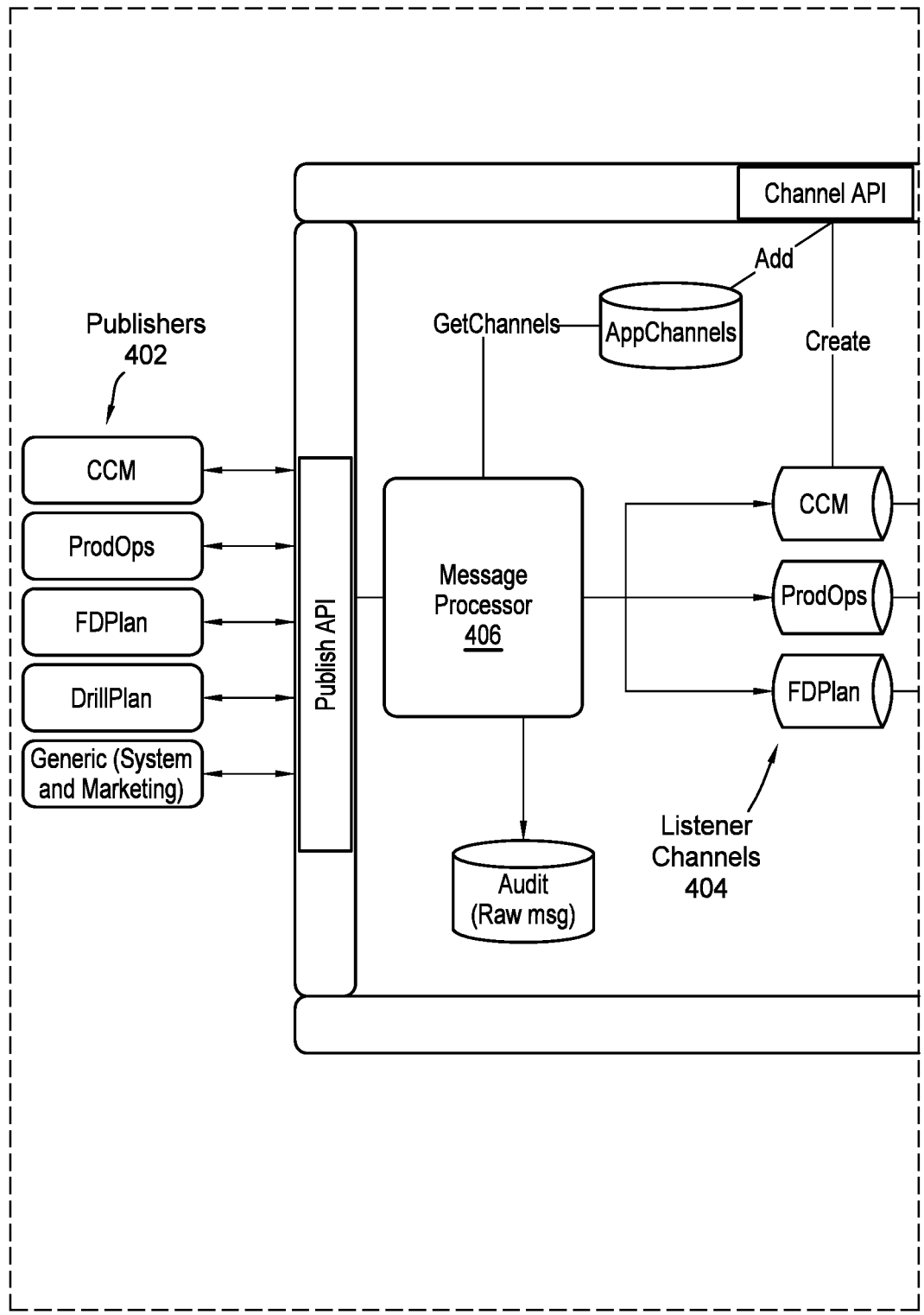
FIG. 4.2

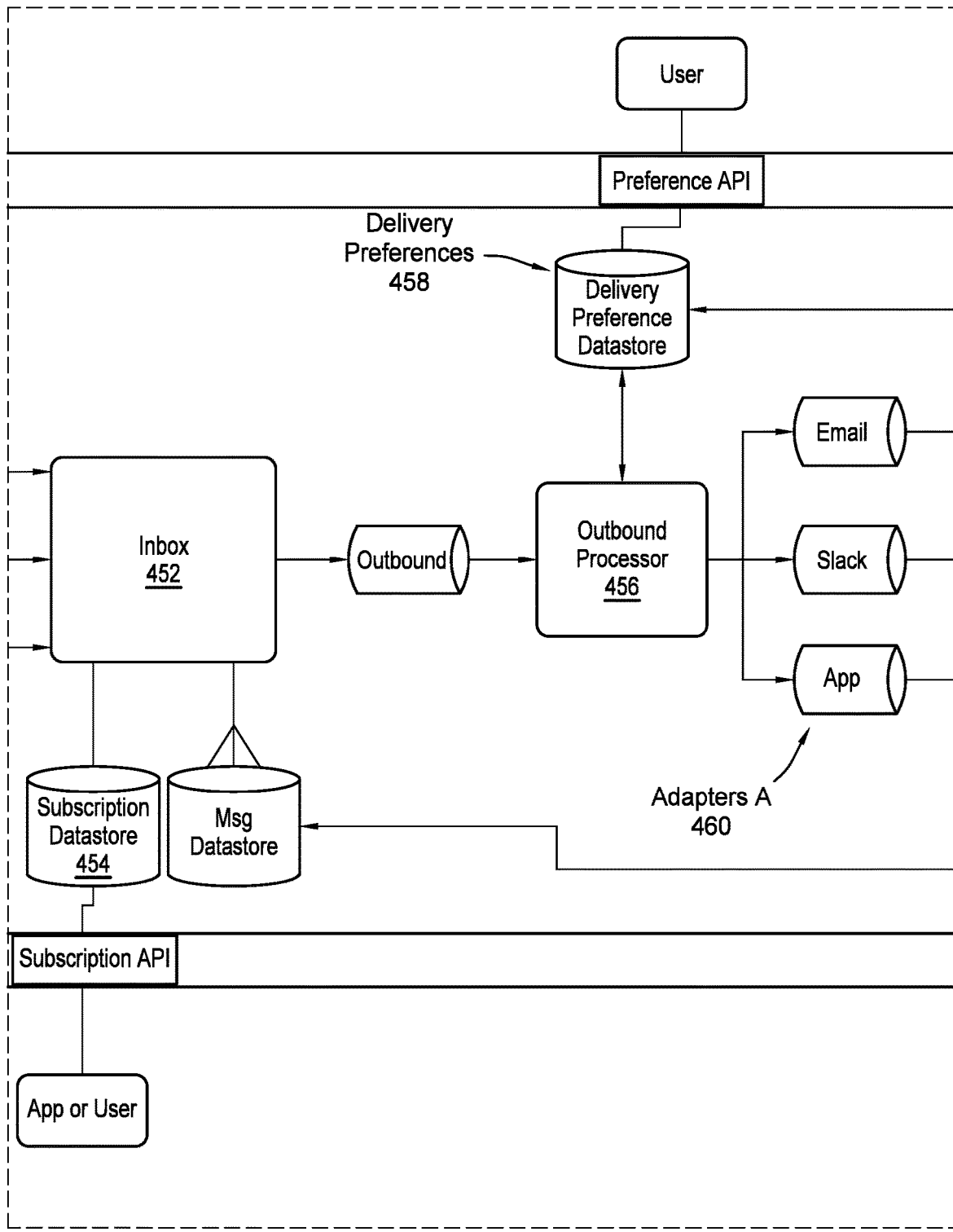
FIG. 4.3

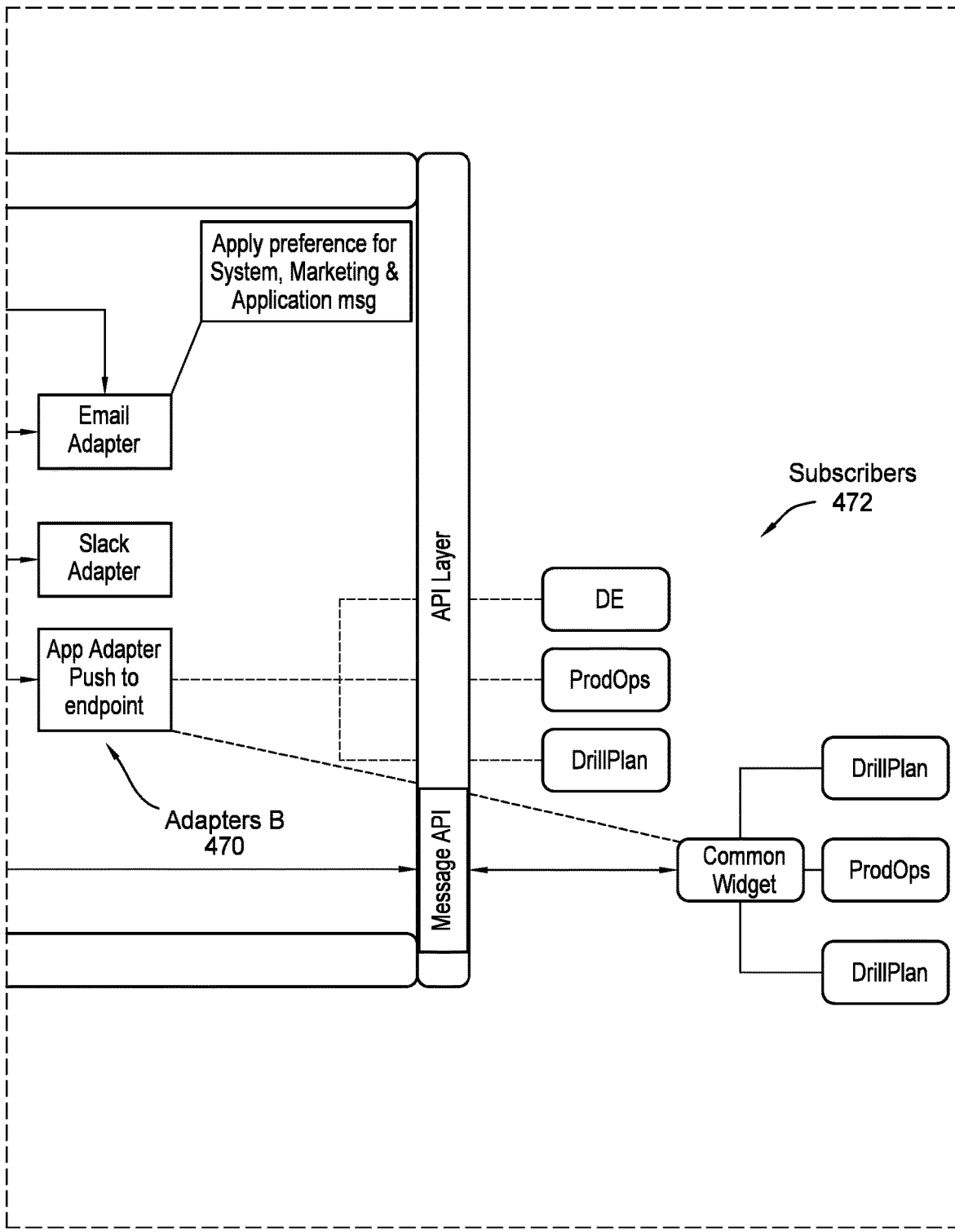
FIG. 4.4

| Section | Field | Type | Must Have? | Notes |
|---|---|---|---|---|
| Origin | App | string | must have | origin of the message |
| | User | string (email) | optional | user who sent the message |
| Destination | Pub/Sub Topic | string | must have | standardized topic list, for app it's appcode in DELFI product definition |
| | Context | string | optional | collaboration context that a group of users is interested, e.g. "Well 1" in DrillPlan that a group of user is working on |
| | User(s) | string (email) | optional | user, list of user, group, role |
| | Sequence Number | long | optional | sequence number of message if order of message must be guaranteed |
| Meta | Priority | Enum | must have | priority of message |
| | Expire at | DateTime | optional | expiration time of the message |
| | Send at | DateTime | optional | time for message to be sent at |
| | Format | Enum | optional | plain text (default), JSON, HTML, ...etc |
| Body | Title | string | must have | title of the message |
| | Body | string | must have | body of the message |

FIG. 5

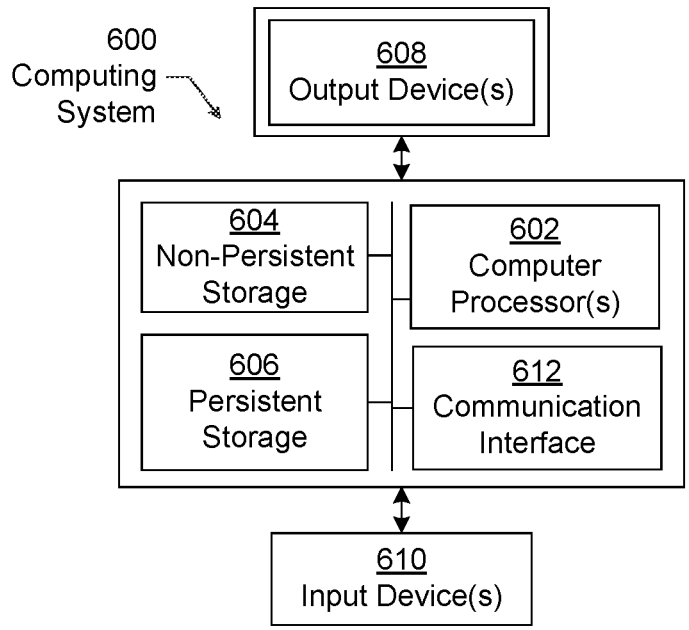
*FIG. 6.1*
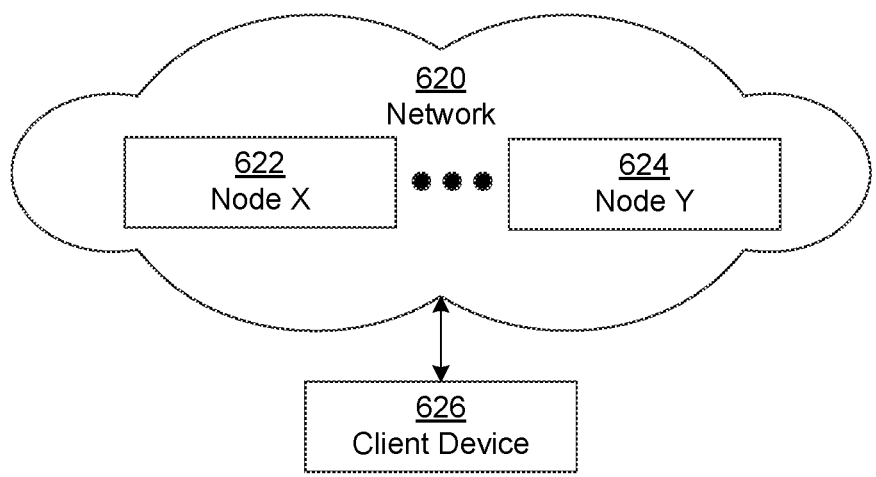
*FIG. 6.2*

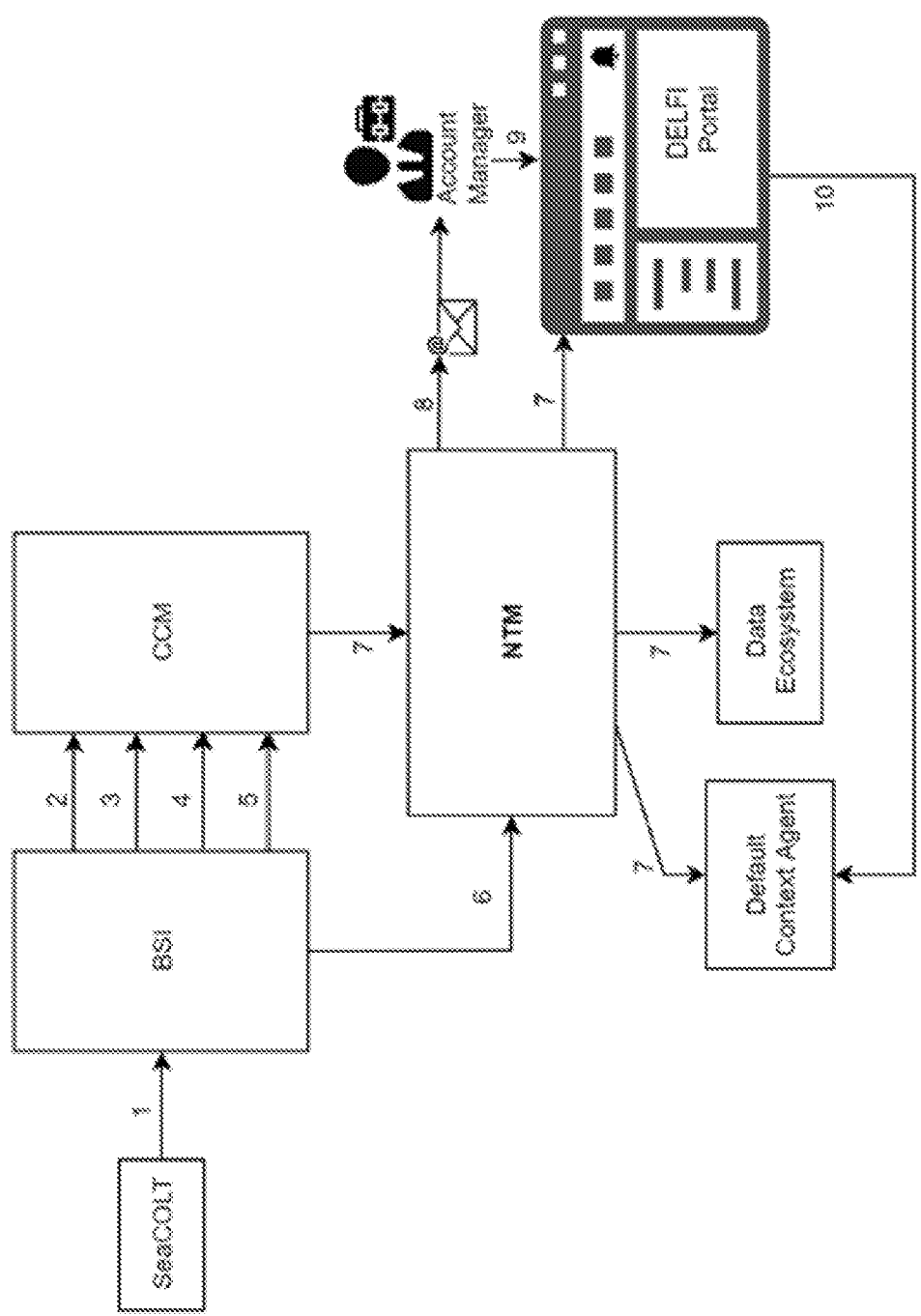
FIG. 7.1

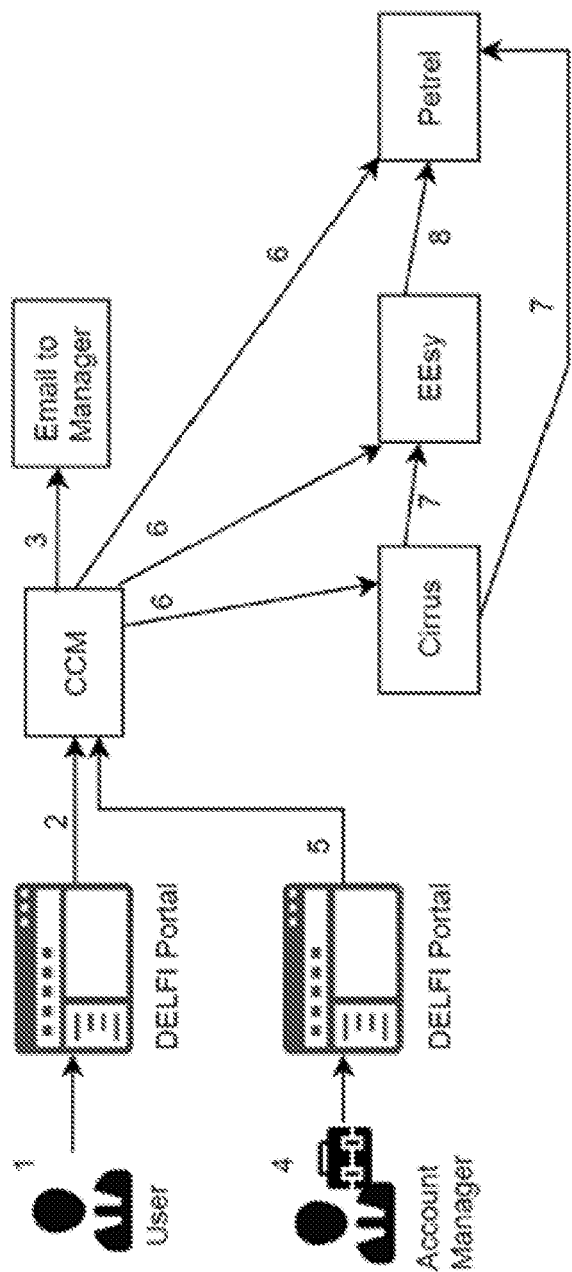
FIG. 7.2

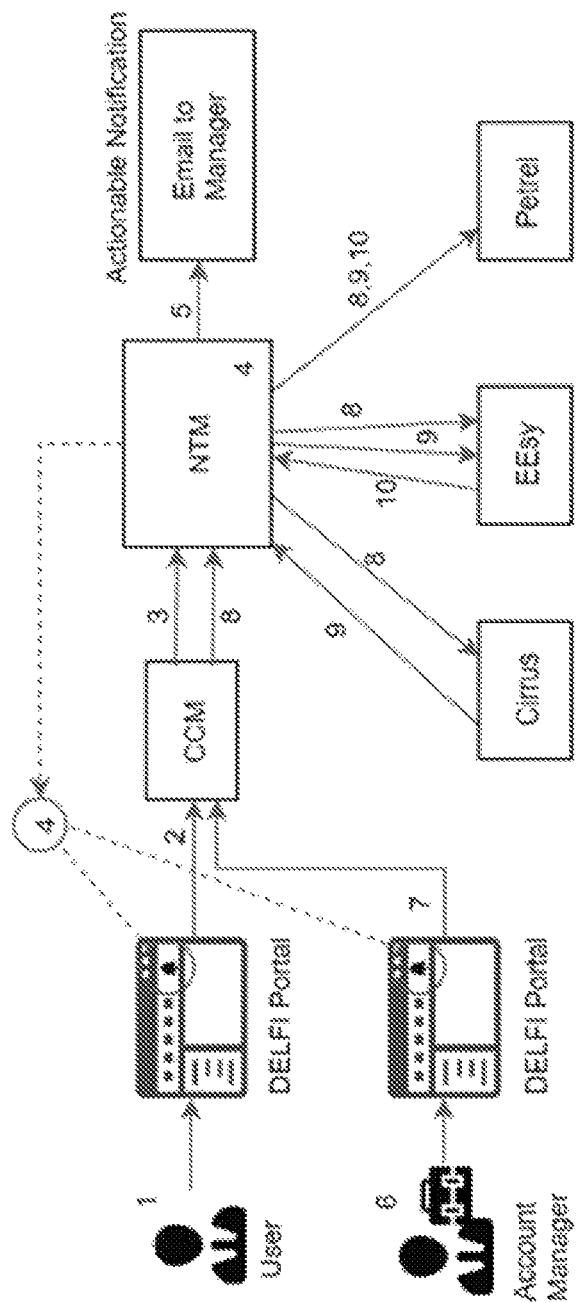
*FIG. 7.3*

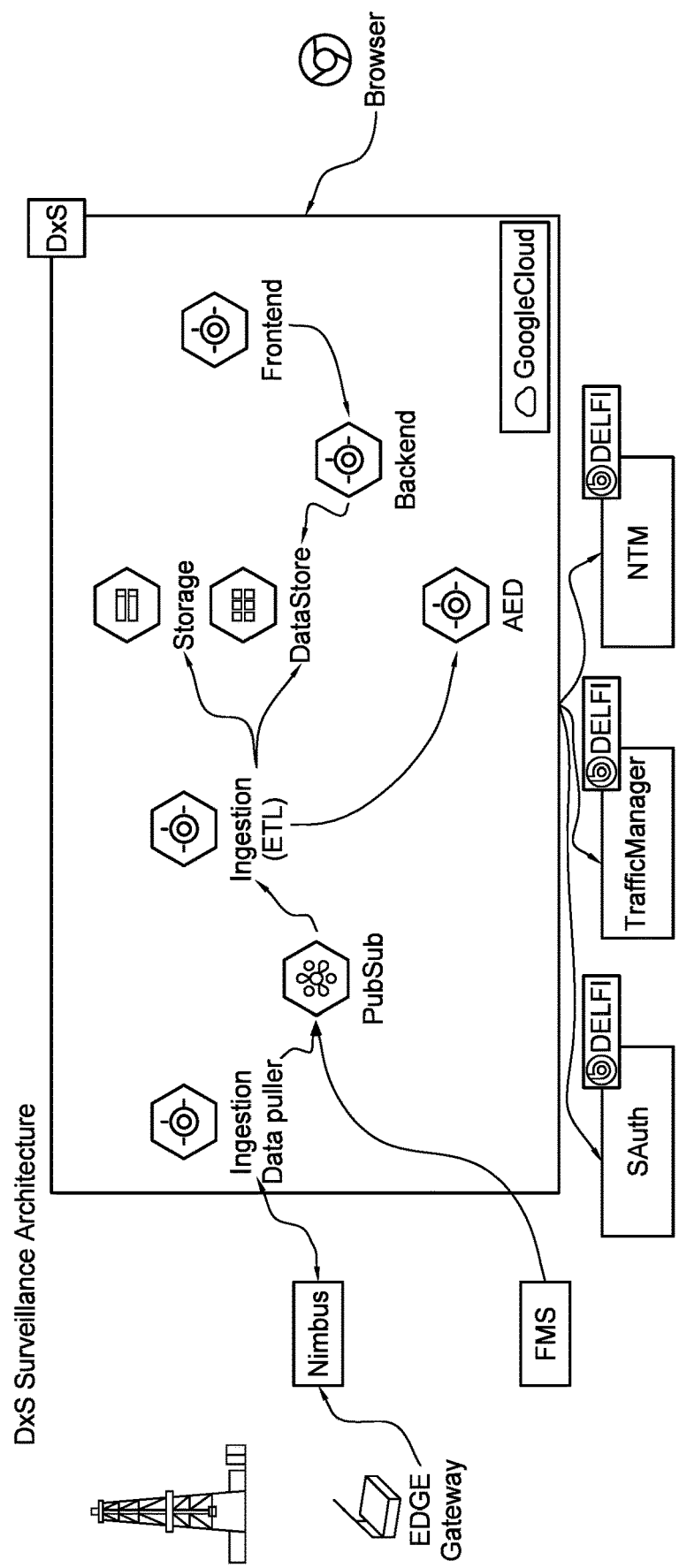
FIG. 7.4

NOTIFICATION AND TASK MANAGEMENT SYSTEM

CROSS-REFERENCE TO RELATED APPLICATION

This application claims benefit under 35 U.S.C. § 119(e) to U.S. Provisional Patent Application Ser. No. 62/799,572, filed on Jan. 31, 2019, having the same inventors, and entitled "NOTIFICATION AND TASK MANAGEMENT SERVICE FOR WORKFLOWS." U.S. Provisional Patent Application Ser. No. 62/799,572 is incorporated herein by reference in its entirety.

BACKGROUND

In the oil and gas industry, data is often generated from a variety of sources for clients that need to remain privy to the operational aspects of their services operating using exploration and production technology. When data is not consistent or inaccessible, decisions made by such clients may not be the most well-informed, potentially resulting in production inefficiencies, or potentially a catastrophic event as information wasn't accessible in a timely manner.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including receiving, at a listener channel, an event described by a message, determining, using the message, a subscriber of the listener channel, determining, using a delivery preference of the subscriber, an adapter to deliver the message, and dispatching, via the adapter, the message to the subscriber.

Other aspects of the disclosure will be apparent from the following description and the appended claims.

BRIEF DESCRIPTION OF DRAWINGS

FIGS. 2.1 and 2.2 show diagrams of a system in accordance with disclosed embodiments.

FIGS. 4.1, 4.2, 4.3, 4.4, and 5 show examples in accordance with disclosed embodiments.

FIGS. 6.1 and 6.2 show computing systems in accordance with disclosed embodiments.

FIGS. 7.1, 7.2, 7.3, and 7.4 show workflows in accordance with disclosed embodiments.

DETAILED DESCRIPTION

Figure 1:
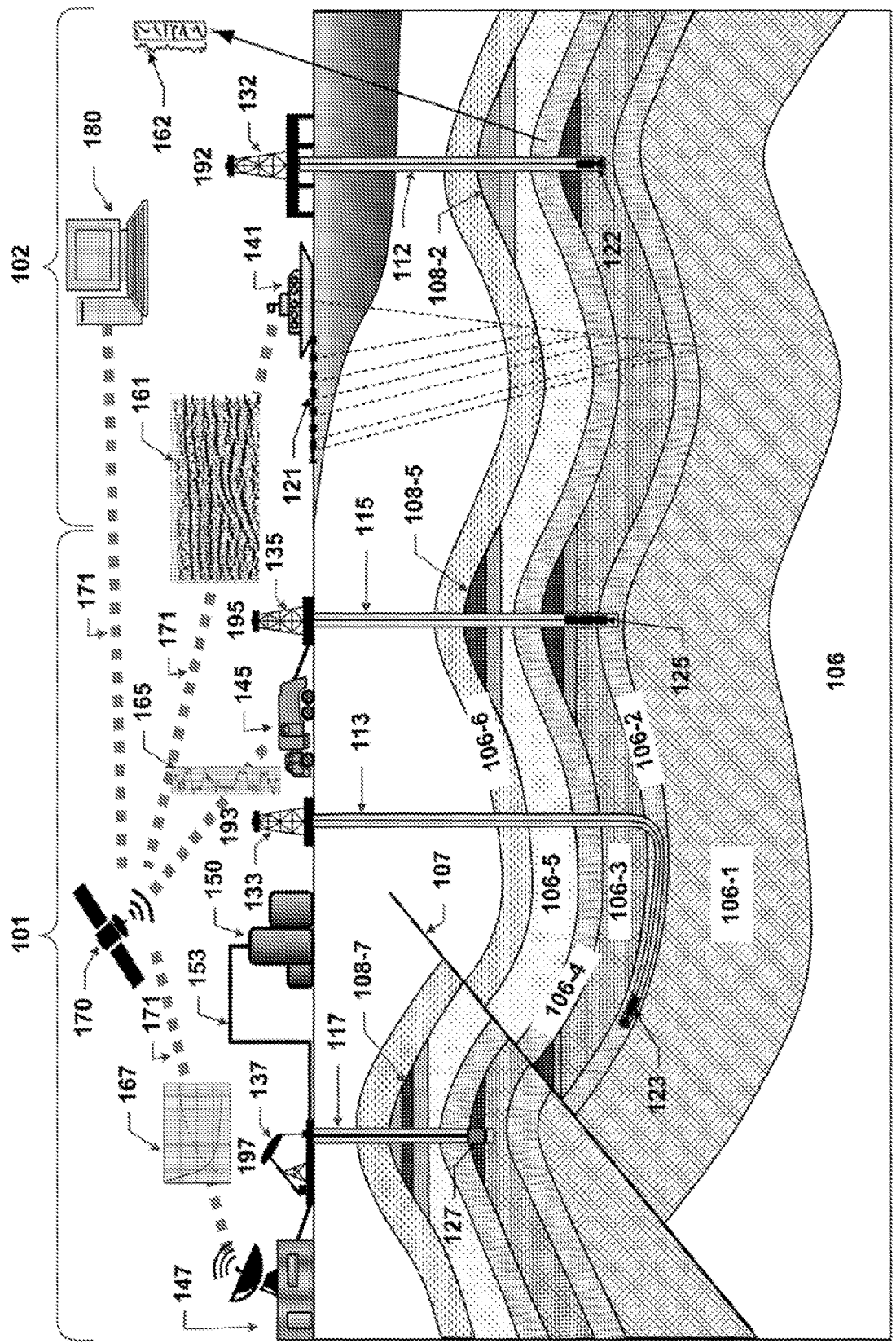
FIG. 1 shows a diagram of a system in accordance with disclosed embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Exploration and production (E&P) of an oilfield involves uses a variety of software applications (e.g., drilling tool design application, production system design, drilling simulators, production simulators, pipeline management, etc.). A framework supports the development, deployment, and management of E&P software applications. The framework is a secure and open environment where capabilities can be added and made available under control of the team developing and operationalizing each digital solution.

Components of the framework are modeled as set of RESTful services and include Cloud Foundation Services, Cloud Development Services, and Data Services. The software applications consume the services to perform business or domain operations in an oil-field under a regulated environment. Software applications, both internal and external, has access to cloud foundation, development, and data services through an application programming interface (API) gateway. The Cloud Foundation Services target contract management, cloud security, traffic management, notifications, task management, and offers a portal for the framework. Cloud Development Services offers a suite of services to run the framework as platform agnostic serverless cloud services, spin up virtual machines with preloaded E&P software, and support three-dimensional (3D) data visualization. Data services offer data ingestion, consumption, management widget along with an automated data curation framework for software applications.

The applications interact via core services to perform manual and automated domain workflows that are controlled, regulated, and operated under the guidelines of the framework. The framework mandates that digital solutions have a proper support and escalation processes in place before being considered commercial. Solutions should use the Service Operations Controls guidelines when commercializing their support strategy.

A problem exists that the software applications should communicate, trigger events, and share data references seamlessly among themselves. In other words, the applications should not just interact with other application in a direct one-to-one fashion. One or more embodiments provide a central hub to avoid highly complex communication networks. The central hub allows software applications to register data pipelines, manage tasks, design workflows and define their triggers. Further, the central hub sends reminders based on due date, has priority-based alerts and status, and schedule automated tasks based on deadlines.

In general, embodiments of the disclosure are directed to a process for notification and task management. The process for notification and task management provides a unified solution to accommodate different modes of communication (e.g., unicast, multicast, broadcast) through different delivery media (e.g., email, in-application, Slack, SMS, etc.) to support the execution of task workflows. In one or more embodiments, an event published by a publisher and described by a message is received at a listener channel. The publisher has a publisher type, such as "software application", "user", "machine learning model", etc. For example, an oilfield services application may generate the event. Alternatively, a machine learning model may generate the event based on detecting an anomaly in a stream of messages.

The message may be routed to the listener channel based on a topic associated with the message. A subscriber of the listener channel is determined, using the message and a subscriptions data repository that indicates topics corresponding to subscribers. A context of the event may also be used to determine the subscriber. The subscriber has a subscriber type, which may be "software application", "user", etc. An interaction type may be assigned to the message based on the publisher type of the publisher of the event as well as the subscriber type of the subscriber. For example, the interaction type may be "software application to user" when the publisher type is "software application" and the subscriber type is "user". An adapter to deliver the message to the subscriber is determined using a delivery preference of the subscriber. The delivery preferences of the subscriber may be based on an interaction type and/or a priority level of the message. For example, the delivery preference may specify that the adapter is an email system when the interaction type is "software application to user", unless the priority level is high, in which case, the adapter is a specific software application used by the user. The message is dispatched to the subscriber via the adapter. The subscriber may perform an action in response to receiving the message. For example, the subscriber may be a software application that processes a warning message by performing an action that suspends a drill plan until a human operator investigates a potential problem identified in the message.

FIG. 1 depicts a schematic view, partially in cross section, of an onshore field (101) and an offshore field (102) in which one or more embodiments may be implemented. In one or more embodiments, one or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an E&P computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). In one or more embodiments, the rock formations include at least one seal rock, for example, the shale layer (106-6), which may act as a top seal. In one or more embodiments, the rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

In one or more embodiments, data acquisition tools (121), (123), (125), and (127), are positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). In one or more embodiments, a wellsite system may be connected to a production equipment. For example, the well system (197) is connected to the surface storage tank (150) through the fluids transport pipeline (153).

In one or more embodiments, the surface units (141), (145), and (147), are operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. In one or more embodiments, the surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

In one or more embodiments, the surface units (141), (145), and (147) are communicatively coupled to the E&P computer system (180) via the communication links (171). In one or more embodiments, the communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. In one or more embodiments, the E&P computer system (180) is provided with functionality for manipulating and analyzing the data, such as analyzing seismic data to determine locations of hydrocarbons in the geologic sedimentary basin (106) or performing simulation, planning, and optimization of E&P operations of the wellsite system. In one or more embodiments, the results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined.

In one or more embodiments, the E&P computer system (180) is implemented by an E&P services provider by deploying applications with a cloud-based infrastructure. As an example, the applications may include a web application that is implemented and deployed on the cloud and is accessible from a browser. Users (e.g., external clients of third parties and internal clients of the E&P services provider) may log into the applications and execute the functionality provided by the applications to analyze and interpret data, including the data from the surface units (141), (145), and (147). The E&P computer system and/or surface unit may correspond to a computing system, such as the computing system shown in FIGS. 6.1 and 6.2 and described below.

FIG. 2.1 shows a system (200) in accordance with one or more embodiments of the disclosure. As shown in FIG. 2.1, the system (200) includes publishers (202.1, 202.2), a notification and task management system (204), and subscribers (206.1, 206.2). The publisher is the entity that triggers or publishes the event. A publisher (202.1) may have a publisher type (not shown). For example, the publisher type may be "software application", "user", "machine learning model", etc.

The subscriber is the entity receiving the notification of the event. Similar to the publisher, a subscriber (206.1) may have a subscriber type. For example, the subscriber type may be "software application", "user", "machine learning model", etc. Publishers (202.1, 202.2) and subscribers (206.1, 206.2) may be software applications, such as oilfield services applications. The software applications may be collections of source code including various software components. The software applications may include statements written in a programming language, or intermediate representation (e.g., byte code). The software applications may be transformed by a compiler into binary machine code. Compiled machine code may be executed by a processor (e.g., computer processor (602)) in order to execute software components generated from the software applications. The software applications are any collections of object code (e.g., machine code generated by a compiler) or another form of the software applications. Alternatively, publishers (202.1, 202.2) and subscribers (206.1, 206.2) may be users.

Publishers (202.1, 202.2) may include functionality to publish events (208.1, 208.2) to the notification and task management system (204). An event (208.1) may be an action or occurrence. For example, the event (208.1) may be recognized and/or detected by a publisher (202.1). Examples of events include application downtime, application maintenance, security events such as security breaches, warnings about potential dangers, disruptions, etc. Notifications of events may be actionable or informative. The actionable notifications, when received by a recipient be, triggers the recipient to perform an action. Actionable notifications use the framework of FIG. 2.1 to translate events into tasks. Informative notifications just notify the recipient of the event.

Turning to FIG. 2.2, an event (250) may correspond to a message (252) that describes the event (250). For example, the message (252) may be generated by a publisher (202.1). Continuing this example, the message (252) may include the publisher (202.1) and the publisher type of the publisher (202.1). In one or more embodiments, the message (252) is associated with a communication mode. For example, the communication mode may be: 1) unicast, where a personal message is sent directly to a user or application, 2) multicast, where a message is sent to multiple subscribers, or 3) broadcast, where a message is sent to every user and every application. An event (250) may correspond to one or more topics. Each topic may correspond to a keyword or phrase describing the event (250). In one or more embodiments, a topic corresponds to an identifier.

In one or more embodiments, an event (250) corresponds to a priority level (254) that indicates a level of importance and/or severity of the event (250). Examples of priority levels (254) are "critical", "high", "system level", etc. In one or more embodiments, when the subscriber (206.1) is a user, the user may make a decision regarding a response to the message (252) while using a software application. For example, the user may perform an action within the software application in response to receiving a warning message. Continuing this example, the software application may control a drilling, production, or exploration plan, where the action performed by the user may prevent a potential problem, such as a well collision.

In one or more embodiments, an event (250) corresponds to a context (256) that indicates additional information associated with the event (250). The context describes the environment of the event. For example, context may include one or more of corporate account under which the E&P operation is being performed, billing account for which the E&P operation is being performed, contract that causes performance of the E&P operation, department performing the operation, product being used, subscription to the product, and user performing the operation. A corporate account can have multiple billing accounts. A billing account can have multiple contracts and departments. A contract can have multiple products while a department can have multiple users. A contract is associated with multiple departments and vice versa. A user of a department can access a product of a contract by having a subscription to it. The framework shown in FIG. 1 is a context-based system that uses context to route notifications of events to relevant subscribers. Thus, the context can describe the task that triggered the event, an identifier of a well that is targeted by a drill plan or seismic line associated with a subscriber (206.1).

Returning to FIG. 2.1, subscribers (206.1, 206.2) may subscribe to topics that correspond to events (208.1, 208.2). The subscribers (206.1, 206.2) may receive messages that describe events (208.1, 208.2) from the notification and task management system (204) (e.g., via an adapter (224.1) of the notification and task management system (204)).

Continuing with FIG. 2.1, in one or more embodiments, the notification and task management system (204) includes a message processor (210), a machine learning model (212), listener channels (214.1, 214.2), an inbox service (216), subscriptions (218), a message dispatcher (220), delivery preferences (222), and adapters (224.1, 224.2). In one or more embodiments, the notification and task management system (204) is implemented in hardware (e.g., circuitry), software, firmware, and/or any combination thereof. The notification and task management system (204) may correspond to the computing system (600) described with respect to FIG. 6.1 and the accompanying description below or take the form of the client device (626) described with respect to FIG. 6.2. The notification and task management system (204) may include functionality to send messages describing events (208.1, 208.2) generated by publisher (202.1, 202.2) to subscribers (206.1, 206.2).

The message processor (210) may include functionality to receive events (208.1, 208.2) from publishers (202.1, 202.2). The message processor (210) may include functionality to send messages describing events (208.1, 208.2) to listener channels (214.1, 214.2).

The machine learning model (212) may include functionality to identify an anomaly based on one or more messages. The machine learning model (212) may include functionality to generate an event (208.1) based on an anomaly. In one or more embodiments, the machine learning model (212) includes functionality to detect an anomaly in the values of features extracted from messages. For example, a feature may be a count of messages of a specific type received during a time interval at a gateway. Continuing this example, the messages may describe denial of service events. The anomaly may be a "spike" in the value of the feature. For example, the spike may be detected when a value of the feature exceeds the mean value of the feature by a threshold number of standard deviations or some other statistical measure. The machine learning model (212) may learn (e.g., based on training data) the correlation between the anomaly and the spike in the value of the feature. As another example, the feature may be a count of messages that include a specific value of an attribute of a message.

The machine learning model (212) may be implemented as a classifier. The machine learning model (212) may be implemented as various types of deep learning classifiers such as a neural network classifier (e.g., based on convolutional neural networks (CNNs)), random forest classifier, SGD classifier, lasso classifier, gradient boosting classifier, bagging classifier, ada boost classifier, ridge classifier, elastic net classifier, or NuSVR classifier. Deep learning, also known as deep structured learning or hierarchical learning, is part of a broader family of machine learning methods based on learning data representations, as opposed to task-specific algorithms. The machine learning model (212) may assign a confidence level to each anomaly identified by the machine learning model (212). A confidence interval (e.g., the Wilson score interval) may be used to report the performance of machine learning model (212) in classifying the anomalies.

In one or more embodiments, listener channels (214.1, 214.2) represent logical connections between publishers (202.1, 202.2) and subscribers (206.1, 206.2). Each listener channel (214.1, 214.2) may correspond to one or more topics.

In one or more embodiments, the inbox service (216) includes functionality to identify subscribers (206.1, 206.2) for messages received at listener channels (214.1, 214.2). The inbox service (216) may use the subscriptions repository (218) to identify the subscribers. The subscriptions repository (218) may associate one or more topics with each subscriber. For example, a subscriber (206.1) may register a topic by adding a record (e.g., via an API) to the subscriptions repository (218). In other words, rather than allowing subscribers to directly access listener channels (214.1, 214.2), the inbox service (216) provides a logical connection between publishers (202.1, 202.2) and subscribers (206.1, 206.2). Thus, an event (208.1) published by a publisher (202.1) may be logically subscribed to by multiple subscribers (206.1, 206.2).

In one or more embodiments, the inbox service (216) includes functionality to assign an interaction type to a message that describes an event (208.1). In one or more embodiments, the interaction type is based on the publisher type of the publisher (206.1) of the event (208.1) and the subscriber type of the subscriber (206.1) to the listener channel (214.1) receiving the event (208.1). For example, there may be interaction types corresponding to each possible combination of publisher type and subscriber type. Continuing this example, possible interaction types may include: software application to software application, user to user, software application to user, machine learning model to software application, etc.

In one or more embodiments, the message dispatcher (220) includes functionality to identify adapters (224.1, 224.2) to deliver messages to subscribers (206.1, 206.2). The adapters (224.1, 224.2) are software applications that deliver messages to subscribers (206.1, 206.2). Examples of adapters (224.1, 224.2) include: email systems, widgets (e.g., notification widgets used in software applications), short messaging service (SMS) systems, or any other software application with messaging capabilities. The message dispatcher (220) may use delivery preferences of a subscriber (206.1) to identify the adapter (224.1) to deliver a message to the subscriber (206.1). The delivery preferences may be stored in a delivery preferences repository (222) that associates one or more rules with a subscriber (206.1). The subscriber (206.1). may add a rule to the delivery preferences repository (222) via an API.

Each rule may indicate one or more conditions under which a specific adapter is to be used to deliver a message to the subscriber. In one or more embodiments, the rule is based, in part, on an interaction type assigned to the message. For example, a rule may specify that the adapter (224.1) is an email system when the interaction type is "software application to user". Alternatively, a rule may specify that the adapter (224.1) is a specific software application (e.g., a software application other than an email system) used by the user when the interaction type is "software application to user". As another example, a rule may specify that the adapter (224.1) is a notification widget when the interaction type is "software application to software application".

In one or more embodiments, the rule is based, in part, on a priority level of the event (208.1) described by the message. For example, a rule may specify that the adapter (224.1) is an email system when the interaction type is "software application to user", unless the priority level is high, in which case, the adapter (224.1) is a specific software application used by the user. As another example, a rule may specify that the message is not delivered when the interaction type is "software application to user" and the priority level is low.

Although not shown in FIG. 1, the task management portion of the notification and task management system may follow a layered architecture with a data layer followed by an infrastructure layer, followed by a business layer, followed by an API layer. The service layer has services consumed by the applications to manage tasks, task comments, and attachments. The business layer has business logic used for validation of workflows defined by the applications is imposed by the platform at this layer. The infrastructure layer obliges to event-driven architectural principle through the utilization of underlying infrastructure components. The data layer has operational and analytical data captured for short-term and long-term business uses, respectively.

Although not shown in FIG. 2.1, communication exists between a notification module and a task management module, where the communication is bi-directional. The services under these modules interact with each other to achieve a desired business functionality as and when required. For example, the task management notification system includes a scheduler that runs daily publishing a list of overdue and due within 1-day tasks to the notification system in order to notify respective applications and users under a context. The notification module consumes actionable notifications when acted on by a user or an application, and prompts the notification system to create and assign a task. Microservices that are part of both notification and task management modules co-exist together in the same cluster and interact with each other through in-cluster REST API calls. The API calls allow the various services of the notification and task management system to reduce number of hops over internet, avoid global load balancer, and yet communicate securely with a low latency.

While FIG. 2.1, and FIG. 2.2 show configurations of components, other configurations may be used without departing from the scope of the disclosure. For example, various components may be combined to create a single component. As another example, the functionality performed by a single component may be performed by two or more components.

Figure 3:
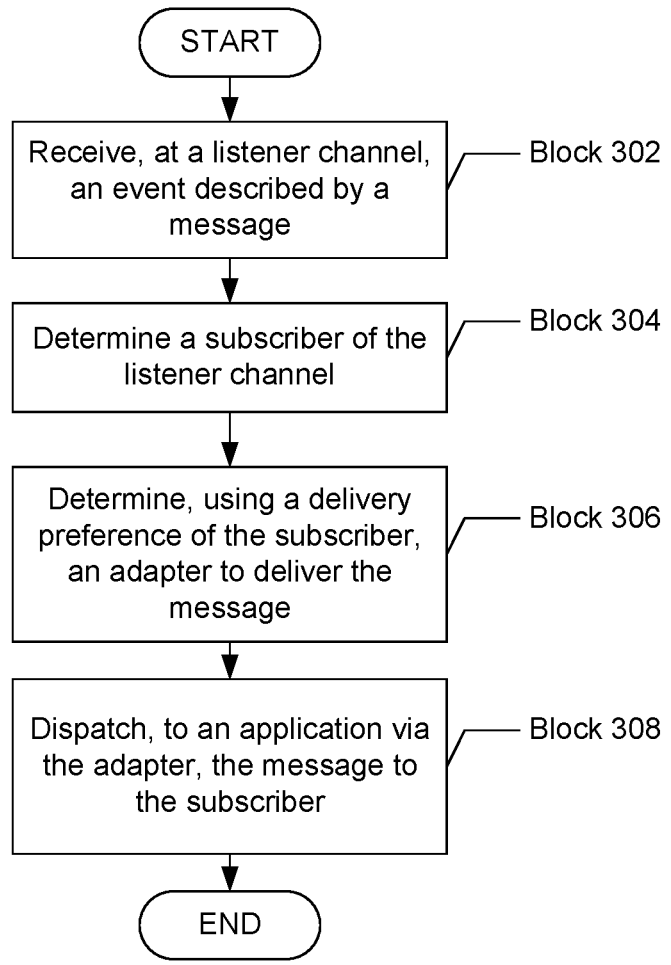
FIG. 3 shows a flowchart in accordance with disclosed embodiments.

FIG. 3 shows a flowchart in accordance with one or more embodiments of the disclosure. The flowchart depicts a process for notification and task management. One or more of the blocks in FIG. 3 may be performed by the components (e.g., the notification and task management system (204) of the system (200)) discussed above in reference to FIG. 2.1 and FIG. 2.2. In one or more embodiments, one or more of the blocks shown in FIG. 3 may be omitted, repeated, and/or performed in parallel, or in a different order than the order shown in FIG. 3. Accordingly, the scope of the disclosure should not be considered limited to the specific arrangement of blocks shown in FIG. 3.

Initially, in Block 302, an event described by a message is received at a listener channel. The event may be stored in a repository. The event may be one of several events received from one or more publishers. The message processor of the notification and task management system may extract a topic associated with the message to determine a listener channel to receive the message. For example, the message processor may extract the topic by parsing the security token included in an API request received from a publisher in order to identify the subject of the token in the context of the corresponding channel maintained with the notification system in a repository of channels.

In one or more embodiments, a machine learning model generates the event based on detecting an anomaly in a stream of messages. For example, the anomaly may correspond to a cyberattack detected by a spike in denial of service messages received by at a network gateway.

In one or more embodiments, before the event is received at the listener channel, the message processor determines a communication mode based on the message. For example, the communication mode may be unicast, multicast, or broadcast. The message processor may determine the communication mode based on the publisher type of the publisher included in the message. Alternatively, the message processor may determine the communication mode based on whether one or more specific fields are included in the message.

In Block 304, a subscriber of the listener channel is determined, using the message. The inbox service of the notification and task management system may determine the subscriber using subscriptions stored in a subscriptions repository. For example, the subscriber may have subscribed to a topic corresponding to the listener channel. The inbox service may further use a context corresponding to the event to determine the subscriber. For example, the context may be working on a task of the subscriber that is associated with a topic corresponding to the listener channel Continuing this example, the task may be tracked by a workflow management system that associates the topic with the task. In one or more embodiments, the inbox service determines recipients (e.g., the subscriber) for the message using the communication mode determined in Block 302 above.

The inbox service may assign an interaction type to the message based on the publisher type of the publisher of the event, in addition to the subscriber type of the subscriber. For example, the interaction type may be "software application to user" when the publisher type is "software application" and the subscriber type is "user".

In Block 306, an adapter to deliver the message to the subscriber is determined using a delivery preference of the subscriber. The message dispatcher of the notification and task management system may determine the adapter using the delivery preference of the subscriber. The delivery preference may include rules based on an interaction type and/or a priority level of the message. For example, the delivery preference may include a rule that specifies that the adapter is an email system when the interaction type is "software application to user", unless the priority level is high, in which case, the adapter is a specific software application used by the user (i.e., subscriber). As another example, if the priority level is "critical" or "high", then regardless of any delivery preferences, the message dispatcher may deliver the message to the subscriber.

The notification and task management system may employ pull and push mechanisms. For example, a subscriber that is a software application may pull a message whose keywords match a topic for which the subscriber has registered. As another example, the message dispatcher, via adapters, may send (i.e., push) a message to a notification widget in a subscriber that is a software application, where the notification widget establishes a socket with a user session when a user is online. As yet another example, the notification widget may create a web socket to establish a session and pull messages (e.g., unread from the time of his/her last login) for a subscriber that is a user, when his/her status changes from offline to online and maintains the session for subsequent push notifications until the user goes back offline.

When a software application that is waiting for a dependent resource in a workflow receives a message, the software application may give a negative acknowledgment for the adapter to retry in order to retrigger the part of the workflow corresponding to the software application, thereby permitting asynchronous execution of synchronous workflows without preserving execution order.

For messages that are to be broadcasted to multiple subscribers, the message dispatcher may expect subscribers that are software applications to pull (e.g., performing a fanout on read) the message and display the message to user(s) of the subscriber, rather than pushing the message to the software application (e.g., instead of performing a fanout on write). For messages that are to be sent directly to multiple subscribers, the message dispatcher may push the messages to respective subscriber software applications and the users of the subscriber software applications.

In Block 308, the message is dispatched to the subscriber via the adapter. In one or more embodiments, the subscriber performs an action in response to receiving the message. For example, the subscriber may be a software application that processes the message by performing the action. Continuing the example, the message may be a warning message and the action may be suspending a drill plan until a human operator investigates a potential problem.

The notification and task management system (NTM) of FIGS. 2.1, 2.2, and 3 encapsulates discrete capabilities both functional and non-functional in nature, to form a unified solution used to build and manage an ecosystem on the platform. Below are some of the distinguishing factors created by one or more embodiments using the NTM. The NTM provides cohesion between notification services and task management services allowing tasks to trigger notifications and notifications to recommend or create tasks. Store & Forward is a rule that NTM meticulously follows for notification messages that are published. The rule is to store an accepted notification. Union rule is employed to construct user and application inbox by NTM inbox service. The application inbox is an inbox generated by NTM based on the union rule below when an application makes a GET/ message/application request. For example, the application inbox may be the destination application union with application to application notifications. The user inbox is an inbox generated by NTM based on the union rule below when an application makes a GET/message/user/{userId} request on user identity. The user inbox includes system messages, marketing messages, application messages, and personal messages.

An audit trail is created of messages as the messages go through the various lifecycle stages. Events that occur within NTM system for messages published are tracked for audit purposes. Thus, a software application or user can track the status of their message published or subscribed through the path through the NTM system.

Further, the NTM is platform agnostic. In other words, if a cloud platform provider is down, the NTM may execute on a different provider.

Message context is top-down matched (match account, contract, followed by department) with subscription context to filter subscriptions during fanout on write and avoid leakage of information to users outside of context. After context filtering, a substring match is performed between the message title and subscription keyword to avoid spamming users and applications under the context.

NTM makes appropriate use of the concepts fanout on read and fanout on write. For messages that should be broadcasted, other than email delivery, NTM expects applications to pull (fanout on read) the broadcast message and display it to users rather than doing fanout on write. For messages that should be sent directly or sent to multiple users or multiple subscribers, the NTM fans out on write and pushes the notifications to respective applications and their users.

Rather than allowing subscribers to directly listen to publisher's channel where underlying infrastructure limitations on number of channels and subscribers hinders the scalability, NTM creates a logical abstraction between publishers and subscribers using its inbox service. A notification when published is logically subscribed by multiple subscribers. However, NTM internal inbox management service is the physical subscriber of those channels. The inbox service then decides to construct the inbox Because of the in-cluster calls between notification and task management modules, lower latency is achieved.

NTM employs both pull and push mechanism. The notifications are available for applications and widgets to pull the information anytime. For applications, NTM pushes notification when the endpoint service is available and retries when application is temporarily down. When the software applications return from downtime, the software application makes a pull request to NTM to retrieve lost notifications. For users online, NTM pushes notifications to notification widget that establishes a socket with a user session. When users come online, notification widget create a web socket and then pulls notification for that user under the user's current context.

The retry mechanism is as follows: NTM retries for seven consecutive days at random intervals based on backlog queue size and priority of notification. When receiving a notification, a software application waiting on a dependent resource in workflow can give a negative acknowledgement for NTM to retry in order to retrigger their part of the workflow. This allows asynchronous execution of synchronous workflows without preserving insertion order. Each individual application understands and pushes the notification with a priority. NTM allows publishers to set a priority for notifications.

FIG. 4.1, FIG. 4.2, FIG. 4.3, FIG. 4.4, and FIG. 5 show an implementation example(s) in accordance with one or more embodiments. The implementation example(s) are for explanatory purposes and not intended to limit the scope of the disclosure. One skilled in the art will appreciate that implementation of embodiments of the disclosure may take various forms and still be within the scope of the disclosure.

In particular, FIG. 4.1 shows an overall diagram in which various sections are expanded in FIGS. 4.2, 4.3, and 4.4. In FIGS. 4.1-4.4, CCM is the Catalog and Consumption Management Module, ProdOps are production operations applications (e.g., software for managing operations during a field's production phase), FDPlan is an agile field development planning solution to devise a field development plan collaboratively (e.g., software for developing and planning a field for the production of hydrocarbons), and DrillPlan is software for creating a coherent well construction planning solution.

Further, in FIGS. 4.1-4.4, the inbox (452) ((216) in FIG. 2.1) connects to listener channels (404) ((214.1, 214.2) in FIG. 2.1) and uses the subscription datastore (454) ((218) in FIG. 2.1) to determine the subscribers (472) ((206.1, 206.2) in FIG. 2.1) for a message. The message processor (406) ((210) in FIG. 2.1) identifies which listener channels (404) will receive messages that describe events published by publishers (402) ((202.1, 202.2) in FIG. 2.1). The message processor (406) then sends messages to the proper listener channel (404). The outbound processor (456) ((220) in FIG. 2.1) receives the messages from the inbox (452). The outbound processor (456) then, based on delivery preferences (458) ((222) in FIG. 2.1) of subscribers, transmits the messages to the corresponding adapters (460, 470) ((224.1, 224.2) in FIG. 2.1). The adapters (460, 470) are the interfaces by which subscribers (472) receive messages.

FIG. 5 shows a chart in accordance with one or more embodiments. FIG. 5 shows a parameterization of the message definition that a publisher may use as a guideline while publishing events. As shown in FIG. 5, the message may be partitioned into sections specifying the origin, destination, metadata, and a body. As shown by the columns, each section may have one or more fields, with each field having a corresponding datatype. The must have column of FIG. 5 indicates whether the field is a required field, and the notes column provides additional detail regarding the field.

Below are example workflows for using the notification and task management system as well as the overall framework. Below is a set of acronyms that are used in the example. A catalog is a compilation of cloud native products offered by a company to the customers of the company. An account manager is a representative of customer who manages their billing account maintained with the company. Software Integrated Solutions (SIS) develops and deploys world-leading upstream oil and gas software and digital solutions. Global expertise and technical knowledge drive continuous innovation, enabling many thousands of global customers to optimize their E&P operations through the integration of technology and data, with domain and process knowledge. SeaCOLT (SIS Enterprise Application-Client Ordering & Licensing Tool) is a client ordering and licensing tool for use by SIS sales community. Cloud Foundation Services (CFS) is a portfolio to provide foundation services to software application under the platform. Catalog & Consumption Management (CCM) is a module under CFS that handles user catalog and consumption in a given context. Business System Integration (BSI) is a module under CFS that handles integration between the platform and business systems. Petrel® Platform is a software platform that brings geosciences, reservoir engineering, production engineering and drilling disciplines together through a unique shared earth approach in order to enable companies to standardize workflows from exploration to production. The portal is a front face to the framework where customers can manage their subscriptions and launch applications from their workspace. Cirrus is a suite of services that provision traditional desktop applications into a cloud environment. EESy is a system that deploys, executes, and monitors heterogenous run-time environments.

For the first workflow, shown in FIG. 7.1, consider the scenario in which a customer is added to the platform. A new contract or a variation order of contract is pushed from COLT to CCM via BSI. After validating the request and payload, the BSI triggers a call to CCM to create a new billing account or fetch existing billing account from CCM. BSI proceeds to create a new contract or fetch existing contract from CCM. For a contract, BSI calls CCM to create default department and associate a data partition to default department. After all the individual resources created at CCM constitute to form a context, BSI requests for creation and assignment of account manager. Once the above is successful, BSI publishes an event to notification and task management system (NTM) of FIG. 2.1 to notify account manager of the contract created and resources provisioned.

In the background, CCM publishes events to the CCM channel maintained at NTM during each of the above operations. NTM pushes these notifications. The default context agents listen to this channel to construct context, while data ecosystem listens to create a physical data partition. NTM publishes an email to account manager for the event pushed by BSI. The account manager accesses the portal and view resources. The account manager logs into the portal. The portal fetches context from default context agent and resources from CCM.

The following is a second workflow, shown in FIG. 7.2. The second workflow is for a subscription request as previously performed without the NTM. A user logs into the portal, requests for a subscription to Petrel® Platform. The portal relays the request to CCM. CCM receives the request and sends an email to a user to notify that his/her request for subscription is received and is currently under processing. Then CCM sends an email to account manager that a user who requested the subscription and requests the account manager approval in order to provision the subscription. The account manager receives the email requesting approval, clicks on the link, logs into portal, and approves the subscription request. The portal forwards the approval to CCM. CCM provisions the subscription to user and notifies or sends a "subscription created" event to Cirrus, EESy, and the Petrel® Platform. The event is sent to Cirrus, EESy, and Petrel® Platform by CCM. Each of the individual applications creates a resource at their end. On receiving the event, Cirrus provisions a virtual machine and notifies EESy and the Petrel® Platform. EESy deploys a run-time environment on the VM and notifies Petrel® Platform to deploy instance. Petrel® Platform deploys an instance on the engine in provisioned virtual machine.

As applications take the responsibility of relaying the information with each other, any downtime or issue at one step would result in a workflow suspension. Such workflows are brittle and susceptible to break at any point. Management of these communication networks is an additional and unwanted burden for each application.

The second workflow for subscriptions is modified using embodiments described herein to create an updated second workflow, shown in FIG. 7.3. The following is an example of the subscription request workflow with NTM. A user logs into portal, requests for a subscription to Petrel® Platform. The DELFT® portal relays the request to CCM. The DELFT® cognitive E&P environment is a collaborative technology that unites the E&P life cycle in the cloud. It's open, secure, scalable, and fully managed, seamlessly connecting people, data and leading software applications across exploration, development, drilling, production and midstream, delivered through a flexible and personalized software as a service (SaaS) subscription model. The Portal allows users, depending on role, to subscribe to products, manage (approve & revoke) subscriptions and users, manage roles (assign & revoke), create and manage data partitions, switch contexts and launch specific products. CCM receives the request and sends a "subscription requested" event to NTM with a user specified as the destination in a message (e.g., where the message is a request payload). NTM interprets the message to determine that the event is a notification to the user and notifies the user that his/her request for a subscription is received and is currently under processing in accordance with his/her delivery preferences (email, SMS, etc.). Then CCM sends a "new subscription request" event to an account manager for approval through NTM. Though there may be a context match, the NTM does not push the notifications to applications as NTM determines that the events correspond to personal messages (or destination messages to individual users) and thus the messages are not broadcast or multicast to applications. The NTM pushes the notification to user and account manager through notification widget. This is an informative notification for user and actionable notification for account manager. The notification is shown as a badge on the bell icon in portal. NTM sends an email to both account manager and user based on their delivery preference. If the user opted out of email notifications, then NTM will not send an email. If the user never specified a delivery preference, then NTM will deliver the message using all delivery media. The account manager logs into portal and approves the subscription. The portal pushes the notification to CCM. CCM provisions the subscription and publishes the "Subscription Created" event to NTM. "Subscription Created" event is pushed to Cirrus, EESy, and Petrel® Platform. Each of these applications provision resources and wait for the next notification. Cirrus provisions VM and publishes to NTM. NTM pushes to EESy and Petrel® Platform. EESy deploys engine to VM and publishes to NTM. NTM pushes the notification to Petrel® Platform. Petrel® Platform deploys an instance of application to the engine on provisioned virtual machine.

The various notifications in the updated second workflow are filtered based on context and keyword to identify the correct recipient of a published notification. NTM continues to retry push notification until the software application receives the notification. If not, NTM triggers an alert to SRE team (Site Reliability Engineering) for manual intervention. As NTM abstracts the complexities and challenges involved in inter-application communication, NTM leaves software applications to focus on business functionality and operate in a light-weight fashion. The principle is very simple: applications publish to their own channel and are not concerned with workflow execution or sequence.

The following is a third workflow for surveillance notification, shown in FIG. 7.4. The surveillance project provides completions product line with a cloud-based solution for the surveillance of distributed measurement (DTS/DVS) data and automatic event detection (AED). The detected events are generally critical notifications and should be received by customer in a timely manner Fiber Optic Sensors are employed to measure Distributed Temperature Sensing (DTS) and Distributed Sensing (DVS) data during well completions phase. DxS surveillance system utilizes AED (Automatic Event Detection) on the data to detect anomalies. As DxS interacts with the framework applications, the DxS understands context under which the well is being operated and identifies the concerned stakeholder for the given context. On a successful event detection, DxS publishes two notification messages through NTM. The first notification is to the stakeholder at customer's end for whom the company is providing the well completions. Another notification to publish to the DxS channel maintained with NTM, for applications to listen. The NTM filters the subscribers based on context and keyword. Thus, the NTM delivers the notification to the software applications that are interested in this specific oil well. Software applications that received the notification can either go to DxS to fetch data used to reconstruct the 3D visualizations or use the notification payload to trigger an alarm.

Embodiments of the disclosure may be implemented on a computing system. Any combination of mobile, desktop, server, router, switch, embedded device, or other types of hardware may be used. For example, as shown in FIG. 6.1, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (622) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (620), such as a touchscreen, keyboard, mouse, microphone, touchpad, electronic pen, or any other type of input device.

The communication interface (622) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6.1. Further, the client device (626) may include and/or perform at least a portion of one or more embodiments of the disclosure.

The computing system or group of computing systems described in FIGS. 6.1 and 6.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 6.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (including layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6.1, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 6.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 6.1 and the nodes and/or client device in FIG. 6.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for managing notifications and tasks in a subterranean drilling, exploration, or production system, the method comprising:
    receiving, at a message processor, a first event described by a first message from a publisher in a network environment, wherein:
        the first message comprises an API request from the publisher,
        the API request includes a security token,
        the API request relates to a topic stored in the security token,
        the topic is at least one of an identifier, a keyword, or a phrase describing an event related to subterranean drilling, exploration, or production, and
        the publisher is at least one of a catalog and consumption management module (CCM) software, a production operations (ProdOps) software, a field development planning (FDPlan) software, or a well construction planning (DrillPlan) software;
    extracting the topic from the first message by parsing the security token to identify a subject of the security token;
    selecting, by the message processor using a subscription data store and further using the topic, a listener channel to which the first message is to be sent, wherein:
        the listener channel is selected from among a plurality of listener channels based on the topic,
        and the listener channel comprises a logical connection between the publisher and at least one of a plurality of subscribers comprising software applications that automatically use the first message;
    receiving, at the listener channel, the first event described by the first message, wherein the first event comprises an action or occurrence automatically generated by the publisher;
    determining, based on the topic, a first subscriber of the listener channel from among the plurality of subscribers, wherein the first subscriber subscribes to electronic communications that are associated with the topic;
    determining, using a first delivery preference of the first subscriber, a priority level of the first event, and a first interaction type of a plurality of interaction types, a first adapter to deliver the first message,
        wherein the first adapter is selected from among a plurality of adapters, and
        wherein the plurality of adapters comprise different software applications usable to deliver the first message;
    dispatching, via the first adapter, the first message to the first subscriber, wherein the first message includes an actionable notification, and wherein the actionable notification uses a framework to translate events into tasks; and
    upon receiving, by the first subscriber, the actionable notification, triggering the first subscriber to perform at least one of the tasks.

2. The method of claim 1, wherein the publisher has a publisher type, and wherein the first message further comprises the publisher and the publisher type, the method further comprising:
    before receiving the first event at the listener channel, determining a communication mode based on the first message, and the first subscriber is further determined using the communication mode.

3. The method of claim 1, further comprising:
    assigning, to the first message and based on a publisher type of the publisher and a subscriber type of the first subscriber, the first interaction type.

4. The method of claim 1, wherein the first subscriber is a software application.

5. The method of claim 1, wherein the first event corresponds to a context, the method further comprising:
    determining, using the context, a second subscriber of the plurality of subscribers; determining, using a second delivery preference of the second subscriber, a second adapter of the plurality of adapters to deliver the first message; and dispatching, via the second adapter, the first message to the second subscriber.

6. The method of claim 1, further comprising:
    extracting, from a plurality of messages, a plurality of features; classifying, using a machine learning model, the plurality of features as an anomaly; generating a second event based on the anomaly; and receiving, at the listener channel, the second event, wherein the second event is described by a second message.

7. A system for managing notifications and tasks in a subterranean drilling, exploration, or production system, the system comprising a processor configured to execute:
    a plurality of listener channels comprising a listener channel, wherein:
        the plurality of listener channels comprises logical connections between a plurality of publishers of a plurality of electronic communications in a network environment and at least one of a plurality of subscribers comprising software applications that automatically use a first message from a publisher of the plurality of publishers,
        the first message comprises an API request from the publisher,
        the API request includes a security token,
        the API request relates to a topic stored in the security token,
        the topic is at least one of a subject of the security token,
        the topic further comprises an identifier, a keyword, or a phrase describing an event related to subterranean drilling, exploration, or production, and
        the publisher is at least one of a catalog and consumption management module (CCM) software, a production operations (ProdOps) software, a field development planning (FDPlan) software, or a well construction planning (DrillPlan) software;
    the plurality of subscribers are subscribed to the plurality of listener channels, the plurality of subscribers comprising a first subscriber of the listener channel, wherein the first subscriber subscribes to electronic communications that are associated with the topic;
    a message processor configured to:
        receive, at the listener channel, a first event described by the first message, extract the topic from the first message by parsing the security token to identify the subject of the security token, and select, using a subscription data store and further using the topic, the listener channel to which the first message is to be sent, wherein the listener channel is selected from among the plurality of listener channels based on the topic;

an inbox service configured to: determine, using the first message and based on the topic, the first subscriber of the listener channel from among the plurality of subscribers; and a message dispatcher configured to:

determine, using a first delivery preference of the first subscriber, a priority level of the first event, and a first interaction type of a plurality of interaction types, a first adapter to deliver the first message,
wherein the first adapter is selected from among a plurality of adapters, and
wherein the plurality of adapters comprises different software applications usable to deliver the first message, dispatch, via the first adapter, the first message to the first subscriber, wherein the first message includes an actionable notification, and wherein the actionable notification uses a framework to translate events into tasks;

and upon receiving, by the first subscriber, the actionable notification, triggering the first subscriber to perform at least one of the tasks.

8. The system of claim 7,
wherein the publisher has a publisher type,
wherein the first message comprises the publisher and the publisher type, and
wherein the inbox service is further configured to:
before the first event is received at the listener channel, determine a communication mode based on the first message, and
determine the first subscriber using the communication mode.

9. The system of claim 7, wherein the inbox service is further configured to:
assign, to the first message and based on a publisher type of the publisher and a subscriber type of the first subscriber, the first interaction type.

10. The system of claim 7, wherein the first subscriber is a software application.

11. The system of claim 7,
wherein the first event corresponds to a context,
wherein the inbox service is further configured to determine, using the context, a second subscriber of the plurality of subscribers, and
wherein the message dispatcher is further configured to:
determine, using a second delivery preference of the second subscriber, a second adapter of the plurality of adapters to deliver the first message, and
dispatch, via the second adapter, the first message to the second subscriber.

12. The system of claim 7, further comprising a machine learning model, wherein the message processor is further configured to:
extract, from a plurality of messages, a plurality of features;
classify, using the machine learning model, the plurality of features as an anomaly;
generate a second event based on the anomaly; and send, to the listener channel, the second event, wherein the second event is described by a second message.

13. A non-transitory computer readable medium comprising instructions that, when executed by a computer processor, perform a method for managing notifications and tasks in a subterranean drilling, exploration, or production system, the method comprising:

receiving, at a message processor, a first event described by a first message from a publisher in a network environment, wherein:
the first message comprises an API request from the publisher,
the API request includes a security token,
the API request relates to a topic stored in the security token,
the topic is at least one of an identifier, a keyword, or a phrase describing an event related to subterranean drilling, exploration, or production, and
the publisher is at least one of a catalog and consumption management module (CCM) software, a production operations (ProdOps) software, a field development planning (FDPlan) software, or a well construction planning (DrillPlan) software;

extracting the topic from the first message by parsing the security token to identify a subject of the security token;

selecting, by the message processor using a subscription data store and further using the topic, a listener channel to which the first message is to be sent, wherein:
the listener channel is selected from among a plurality of listener channels based on the topic,
and the listener channel comprises a logical connection between the publisher and at least one of a plurality of subscribers comprising software applications that automatically use the first message;

receiving, at the listener channel, the first event described by the first message, wherein the first event comprises an action or occurrence automatically generated by the publisher;

determining, based on the topic, a first subscriber of the listener channel from among the plurality of subscribers, wherein the first subscriber subscribes to electronic communications that are associated with the topic;

determining, using a first delivery preference of the first subscriber, a priority level of the first event, and a first interaction type of a plurality of interaction types, a first adapter to deliver the first message,
wherein the first adapter is selected from among a plurality of adapters, and
wherein the plurality of adapters comprise different software applications usable to deliver the first message;

dispatching, via the first adapter, the first message to the first subscriber, wherein the first message includes an actionable notification, and wherein the actionable notification uses a framework to translate events into tasks; and upon receiving, by the first subscriber, the actionable notification, triggering the first subscriber to perform at least one of the tasks.

14. The non-transitory computer readable medium of claim 13, wherein the publisher has a publisher type, and wherein the first message comprises the publisher and the publisher type, and wherein the instructions, when executed by the computer processor, further perform the method to include:

before receiving the first event at the listener channel, determining a communication mode based on the first message, and the first subscriber is further determined using the communication mode.

15. The non-transitory computer readable medium of claim 13, wherein the instructions, when executed by the computer processor, further perform the method to include:

assigning, to the first message and based on a publisher type of the publisher and a subscriber type of the first subscriber, the first interaction type.

16. The non-transitory computer readable medium of claim 13, wherein the first subscriber is a software application.

17. The non-transitory computer readable medium of claim 13, wherein the instructions, when executed by the computer processor, further perform: the method to include:

extracting, from a plurality of messages, a plurality of features;

classifying, using a machine learning model, the plurality of features as an anomaly;

generating a second event based on the anomaly; and receiving, at the listener channel, the second event, wherein the second event is described by a second message.

* * * * *